United States Patent
Kondo et al.

[11] Patent Number: 5,304,389
[45] Date of Patent: Apr. 19, 1994

[54] NON-HYGROSCOPIC ICING COMPOSITION

[75] Inventors: Tsutomu Kondo, Kanagawa; Akio Nishimura, Tokyo, both of Japan

[73] Assignee: Mitsubishi Kasei Corporation, Tokyo, Japan

[21] Appl. No.: 985,956

[22] Filed: Dec. 4, 1992

Related U.S. Application Data

[63] Continuation of Ser. No. 722,463, Jun. 27, 1991, abandoned.

[51] Int. Cl.$^5$ ................................................ A23G 3/00
[52] U.S. Cl. ........................................ 426/659; 127/29; 426/572
[58] Field of Search ............... 426/572, 658, 660, 659; 127/30, 31, 72, 29

[56] References Cited

U.S. PATENT DOCUMENTS

| | | | |
|---|---|---|---|
| 3,600,168 | 8/1971 | Mattson et al. | 426/804 |
| 3,803,333 | 4/1974 | Roudebush | 426/572 |
| 3,874,924 | 4/1975 | Sands et al. | 426/213 |
| 3,917,874 | 11/1975 | Sands et al. | 426/572 |
| 5,102,680 | 4/1992 | Glass et al. | 426/572 |
| 5,104,680 | 4/1992 | Padley et al. | 426/572 |

*Primary Examiner*—Jeanette Hunter
*Attorney, Agent, or Firm*—Sughrue, Mion, Zinn, Macpeak & Seas

[57] ABSTRACT

A non-hygroscopic icing composition is disclosed. The icing comprises sugar, fat and an emulsifier as the main components, wherein 80% by weight or more of said sugar is particles passing through a 63 μm mesh size sieve and 40% by weight or more of said sugar is particles having a size of from 32 μm to 63 μm and the sugar content in the icing is 50% by weight or more.

9 Claims, No Drawings

NON-HYGROSCOPIC ICING COMPOSITION

This is a continuation of co-pending U.S. Ser. No. 07/722,463 filed Jun. 27, 1991 now abandoned.

FIELD OF THE INVENTION

The instant invention relates to an icing composition for coating bakery products such as cakes, decorated cakes, doughnuts, pastries, rolls, cookies, biscuits and crackers.

BACKGROUND OF THE INVENTION

It is needed that an icing, which is a common name of sugar coating, satisfies various requirements, for example, improving the eye-appeal of a baked product by imparting a fine texture and a good gloss and having a high spreadability, a high resistance to moisture and a good mouth feel (taste). There are a number of icings. A typical example thereof is so-called flat icings which have been neither creamed or whipped. These flat icings are called in various names (for example, Glace, Fondant and Chocolate Icing) depending on the purpose. They are frequently used for coating pastries and doughnuts. In addition, there are many icings containing fresh cream, margarine, shortening or butter. Further aerated ones such as butter cream, whipped cream, garnish, meringue, marshmallow, nougat and marzipan may be cited by way of example.

A typical icing for coating baked goods, such as bread and cakes, may be prepared by adding small amount of syrup and water to sucrose, heating the mixture to 106° to 107° C. followed by cooling and vigorously grinding the supersaturated solution thus obtained to thereby form microcrystals of sucrose. In this icing, the microcrystals of sucrose are coated with the syrup. An icing called Fondant generally falls within this type.

However, when baked goods are coated with such a conventional icing as described above and then packaged in a sack, the icing is subjected to deliquescence due to its hygroscopicity and moisture content in the baked goods would migrate into the icing, resulting in the dissolution of the sucrose crystals in the icing with a lapse of time. As a result, the white icing becomes transparent and tacky, thus causing "dissolution of icing", which seriously deteriorates the appearance and handling characteristics of the products and damages the commercial value thereof.

Although there has been attempted to add fats and emulsifiers to icings to relieve the dissolution of icing and surface tackiness, these problems cannot be solved thereby.

On the other hand, there has been known a method for preventing dissolution of sucrose in a chocolate icing by coating sucrose crystals with a fat. More particularly, this method comprises mixing sucrose, fat and an emulsifier and finely grinding sucrose crystals with a triple roll mill in such a manner as to give a particle size of approximately 20 μm. When the icing contains 60 wt % or more of sugar and 40 wt % or less of fat, however, the flowability of the icing is lowered even though heating to 70° C. and thus the handling characteristics such as spreadability of the product are deteriorated. Although the flowability may be improved by elevating the fat content, there is a risk in this case that an intense fat taste and a waxy mouth feel become noticeable and thus the sweetness is masked.

Accordingly, there has been required to develop an icing which contains a large amount of sugar and a small amount of fat and has a high flowability upon heating.

Attempts have been made to reduce the hygroscopicity of an icing. For example, U.S. Pat. No. 3,699,688 has proposed to add malto-dextrin as a stabilizer; U.S. Pat. No. 3,676,155 has proposed to replace some portion of sucrose with a dextrose powder; and U.S. Pat. No. 4,415,601 has proposed to add vegetable starch and powdered whey mixed with a high melting point fat. However, these attempts have not yet been sufficient.

SUMMARY OF THE INVENTION

The present inventors have found out that the particle size of sugar would largely influence the viscosity and spreadability of a mixture of the sugar and fat, thus completing the present invention.

An object of the present invention is to provide a non-hygroscopic icing which neither undergoes dissolution nor becomes tacky when it is applied onto the surface of baked products and then packed in sacks.

Other objects and effects of the present invention will be apparent from the following description.

Accordingly, the gist of the present invention resides in a non-hygroscopic icing composition comprising sugar, fat and an emulsifier as the main components, wherein 80% by weight or more of said sugar is particles passing through a 63 μm mesh size sieve and 40% by weight or more of said sugar is particles having a size of from 32 μm to 63 μm and the sugar content in the icing is 50% by weight or more.

DETAILED DESCRIPTION OF THE INVENTION

The present invention will be described in detail.

The sugar to be used in the present invention is not particularly restricted and, for example, sucrose, glucose, erythritol, lactose, palatinose, DFA III and maltose may be used therefor. Among these sugars, sucrose, glucose and erythritol are particularly preferable. Either one of these sugars or a mixture thereof may be used in the icing composition of the present invention in an amount of 50% by weight or more, preferably 60 to 80% by weight and still preferably 70 to 75% by weight.

In the icing composition of the present invention, 80% by weight or more, preferably 90% by weight or more and still preferably 99% by weight or more, of the sugar particles pass through a 63 μm mesh size sieve. Further, 40% by weight or more, preferably 50% by weight or more, of the sugar is particles having a size of from 32 μm to 63 μm. Still preferably, 50% by weight or more of the sugar is particles having a size of from 45 μm to 63 μm. The particle sizes as described herein are determined on the basis of those obtained by using standard sieves specified in JIS Z 8801 (1987) which corresponds to ASTM E11-87. When the particle size is excessively small, the obtained icing shows a poor flowability and thus can be hardly spread even though upon heating. Although the object of the present invention can be achieved when the icing composition contains sugar particles remaining on a 63 μm mesh size sieve, excessively large particles would make the texture of the icing not smooth but coarse.

The fat component to be used in the present invention may be appropriately selected from among edible ones depending on the purpose. Particular examples thereof include 1,3-disaturated fatty acid-2-unsaturated fatty acid triglycerides (i.e., characteristic components of cacao butter) collected from natural or synthetic fat materials, triglycerides containing trans-isomers of unsaturated fatty acids obtained by hydrogenating fat materials containing unsaturated fatty acids as fatty acid component under controlled conditions and fats containing lauric acid as the major fatty acid component, such as coconut oil and palm kernel oil, which may be optionally hydrogenated (lauric acid type hard butter). In general, those marketed as a filling cream for cookies are suitable therefor. Further, a hardened oil or an extremely hardened oil may be used as some portion of the fat in order to accelerate the solidification of the icing composition after applying to baked products.

Furthermore the meltability in mouth and the texture of the icing may be controlled by combining two or more fats differing in melting point (m.p.) and solid fat index (SFI) from each other. For example, a fat of a m.p. of 23.6° C. and another one of a m.p. of 40° C. may be optionally blended together. In this case, the blending ratio may be appropriately adjusted so as to deal with a climatic change in temperature. Therefore an icing composition mainly comprising a fat component of a high m.p., which withstands distribution in summer, can be prepared. In addition, an icing of a desired texture can be obtained by mixing fats differing in SFI from each other to thereby control the SFI of the fats.

The icing composition of the present invention may usually contain 50% by weight or less, preferably 20 to 40% by weight and still preferably 25 to 30% by weight, of the fat component. When a hardened oil is to be used, some portion of the fat component may be replaced with the hardened oil so as to control the content of the hardened oil in the icing composition to 0.1 to 3% by weight, preferably 0.3 to 1.5% by weight.

As the emulsifier to be used in the present invention, lipophilic ones are preferable. Examples thereof include sucrose fatty acid esters, polyol fatty acid esters, such as polyglycerol fatty acid esters, sorbitol fatty acid esters and propylene glycol fatty acid esters, and lecithin. Either one of these emulsifiers or a mixture thereof may be used in the present invention. Among these emulsifiers, lipophilic sucrose fatty acid esters and/or lipophilic polyglycerol fatty acid esters are particularly preferable. As the lipophilic sucrose fatty acid esters, those comprising saturated fatty acids and/or unsaturated fatty acids having 16 to 24 carbon atoms as the constituting fatty acids and having an average degree of substitution of 4 to 7 are preferable. It is still preferable to use sucrose fatty acid esters comprising unsaturated fatty acids as constituting fatty acids. Particular examples thereof include sucrose stearate, sucrose oleate and sucrose erucate.

As the lipophilic polyglycerol fatty acid esters, those comprising saturated fatty acids and/or unsaturated fatty acids having 12 to 2 carbon atoms as the constituting fatty acids and having a degree of condensation of glycerol (namely, the degree of polymerization of polyglycerol) of 4 to 10 and an average degree of esterification of 50% to 90% are particularly preferable. Examples thereof include hexaglycerol pentastearate and hexaglycerol pentaoleate. The degrees of lipophilic properties of these emulsifiers expressed in HLB value may range generally from 2 to 7 and preferably from 3 to 6.

The icing composition of the present invention may contain usually from 0.1 to 3% by weight, preferably from 0.1 to 1.5% by weight, of the emulsifier. Further, it may contain skim milk powder, flavoring and essence, if required.

The icing composition of the present invention may be prepared by blending and homogenizing the components by a conventional method. The grain size distribution of the sugar may be preliminarily controlled to a desired level by, for example, grinding. Alternatively, the components are blended together and then ground so as to give the desired grain size.

An icing composition, which is generally spread upon heating and then solidified by cooling, should remain spreadable over a temperature range wherein sugars would not decompose. Accordingly, a lower viscosity of the icing composition is the better. Thus the viscosity of the icing composition may be preferably adjusted to 100 Poise or below within a temperature range of from 60° to 90° C., when taking its flowability at the application to baked products into consideration. The temperature range of from 60° to 90° C. is specified since an icing would frequently undergo browning or oxidation of fats when heated at 90° C. or above for a long time. When the moisture content of the icing composition exceeds 1% by weight, the viscosity of the icing would increase. However the viscosity can be controlled by adjusting the content of the emulsifier.

The present invention will now be illustrated in more detail by reference to the following examples. However, the present invention should not be construed as being limited thereby. In these examples, sieving was performed by using a sieve shaker MRK (product of MITAMURA RIKEN KOGYO Inc.; dial 98, 10 minutes) and every % is by weight.

EXAMPLE 1

70.0% of sucrose as specified in Table 1, 29.5% of a fat (Melano STS; a trade name; product of Fuji Oil Co.) and 0.5% of a sucrose fatty acid ester (Ryoto Sugar Ester RE-290; a trade name; product of Mitsubishi Kasei Corporation, sucrose erucate (HLB 2) of average degree of substitution of 4.5) were mixed together to thereby give icing composition Nos. 1—1 and 1-2 having a moisture content of 0.05% and 0.2%, respectively.

The viscosity (P) of each of the obtained icing compositions was measured at 70° C. with an EHD viscometer (product of TOKIMEC Inc.) at 0.5 rpm. Table 1 shows the results.

TABLE 1

| Particle size of sucrose | Icing Composition 1-1 (P) | 1-2 (P) |
|---|---|---|
| 20 μm (*1) | 1,000< | 1,000< |
| ≦63 μm (*2) | 24 | 30 |
| 63–106 μm | 31 | 118 |
|  | (poor and coarse texture) | (poor and coarse texture) |
| 106–150 μm | separated (separation of sugar from fat) | separated (separation of sugar from fat) |

Note
(*1): Triple with triple roll mill after mixing.
(*2): Grain size distribution:
63–53 μm 35.5 (%)
53–45 μm 40.9 (%)
45–32 μm 11.8 (%)
32–22 μm 11.6 (%)
<22 μm 0.2 (%)

TABLE 1-continued

| | Icing Composition | |
|---|---|---|
| Particle size of sucrose | 1-1 (P) | 1-2 (P) |
| total | 100.0 (%) | |

EXAMPLE 2

The procedure of Example 1 was repeated except that the sucrose fatty acid ester was replaced with a polyglycerol fatty acid ester of a degree of esterification of 63% (Hexaglyn 5-0 NIKKOL; a trade name; product of Nikko-Chemicals Co., Ltd.) to thereby give icing composition Nos. 2-1 and 2-2 having a moisture content of 0.05% and 0.2%, respectively. Then the viscosity of each of the obtained icing compositions was measured in the same manner as the one described in Example 1. Table 2 shows the results.

TABLE 2

| | Icing Composition | |
|---|---|---|
| Particle size of sucrose | 2-1 (P) | 2-2 (P) |
| 20 μm (*1) | 1,000< | 1,000< |
| ≦63 μm (*2) | 16 | 20 |
| 63–106 μm | 21 | 72 |
| | (poor and coarse texture) | (poor and coarse texture) |
| 106–150 μm | separated (separation of sugar from fat) | separated (separation of sugar from fat) |

Note
(*1): Triple with triple roll mill after mixing.
(*2): Grain size distribution:
63–53 μm 35.5 (%)
53–45 μm 40.9 (%)
45–32 μm 11.8 (%)
32–22 μm 11.6 (%)
<22 μm 0.2 (%)

EXAMPLE 3

The procedure of Example 1 was repeated except that the weight ratio of sucrose to fat were changed as specified in table 3 to thereby give icing composition Nos. 3-1 to 3-5 having a moisture content of 0.05%, 0.10%, 0.25%, 0.35% and 0.55%, respectively. Then the viscosity of each of the obtained icing compositions was measured in the same manner as the one described in Example 1. Table 3 shows the results.

| 63–53 μm | 25.5 (%) |
|---|---|
| 53–45 μm | 33.5 (%) |
| 45–32 μm | 22.0 (%) |
| 32–22 μm | 18.5 (%) |
| <22 μm | 0.5 (%) |
| total | 100.0 (%) |

TABLE 3

| | Icing Composition | | | | |
|---|---|---|---|---|---|
| Sucrose:fat | 3-1 (P) | 3-2 (P) | 3-3 (P) | 3-4 (P) | 3-5 (P) |
| 5:5 | 2 (separated) | 2 (separated) | 4 (separated) | 5 (separated) | 6 (separated) |
| 6:4 | 5 | 5 | 10 | 13 | 18 |
| 6:4 (*1) | 870 | 1,000< | 1,000< | 1,000< | 1,000< |
| 7:3 | 24 | 27 | 69 | 64 | (*2) |
| 7:3 (*1) | 1,000< | 1,000< | 1,000< | 1,000< | 1,000< |

TABLE 3-continued

| | Icing Composition | | | | |
|---|---|---|---|---|---|
| Sucrose:fat | 3-1 (P) | 3-2 (P) | 3-3 (P) | 3-4 (P) | 3-5 (P) |
| 7.5:2.5 | 77 | 70 | 67 | (*2) | (*2) |

Note
(*1): Treated with a triple roll mill after mixing (particle size:20 μm).
(*2): The formation of sucrose masses made the measurement impossible.
Those marked with (*1) were treated with a triple roll mill after mixing sucrose, fat and emulsifier as shown in Note above. In that case, the particle size became about 20 μm, and the viscosity was increased abruptly. Therefore, they were not suitable as icing compositions.

EXAMPLE 4

By using sucrose having the same grain size distribution as the one given in Example 3, components specified in Table 4 in terms of % were mixed well at 70° C. Then the obtained icing composition was applied onto the surface of a bread sample and the appearance of the coating was examined. Table 4 shows the results. The texture of the icing composition at room temperature was controlled by blending fats differing in SFI from each other. The hardness of the icing could be controlled by blending Melano STS (SFI at 20° C.: 72) with BST (SFI at 20° C.: 11).

TABLE 4

| | Comparative icing (*1) | Invention icing | | | | |
|---|---|---|---|---|---|---|
| | | 4-1 | 4-2 | 4-3 | 4-4 | 4-5 |
| Sucrose | 82 | 74 | 74 | 74 | 74 | 74 |
| Syrup | 7.5 | — | — | — | — | — |
| Fat (*2) | | | | | | |
| Melano STS | — | 12.5 | 10 | 7.5 | 5 | 2.5 |
| BST | — | 12.5 | 15 | 17.5 | 20 | 22.5 |
| Emulsifier ER-290 (*3) | — | 0.5 | 0.5 | 0.5 | 0.5 | 0.5 |
| Extremely hardened rapeseed oil (*4) | — | 0.5 | 0.5 | 0.5 | 0.5 | 0.5 |
| Water | 10.5 | — | — | — | — | — |
| Viscosity (P) (70° C.) | 200< | 72 | 82 | 67 | 68 | 67 |
| Appearance (*5) | B | A | A | A | A | A |
| Texture (room temperature) | soft | somewhat hard | somewhat hard | soft | soft | soft |

Note
(*1): The comparative icing was produced by the following method. 80% by weight of sucrose, 10% by weight of syrup and 10% by weight of water were mixed and molten by heating to 106 to 107° C. After cooling, the obtained supersaturated solution was stirred to thereby form microcrystals of sucrose. Thus an icing was obtained.
(*2): Melano STS (m.p.: 35° C., oleic acid content: 55%) and Melano BST (m.p.: 23.6° C., oleic acid content: 50.8%) (trade names; products of Fuji Oil Co.).
(*3): Sucrose erucate of Ryoto Sugar Ester ER-290 (average degree of substitution: 4.5, HLB: 2) (trade name: product of Mitsubishi Kasei Corporation)
(*4): TP-9 (trade name; product of Nippon Oils and Fats Co., Ltd.).
(*5): Stored at 40° C. under RH of 100% for 3 days. Evaluation of appearance: B: dissolved due to moisture absorption. A: no moisture absorption and no change in appearance.

As Table 4 shows, the invention products were less hygroscopic than the comparative one and thus suffered from neither any dissolution when stored at 40° C. under RH of 100% for 3 days (i.e., the same conditions as those of sealed bakery products).

EXAMPLE 5

The components of the present invention were well mixed at 70° C. in accordance with the formulation given in Table 5 and applied to the surface of a bread sample. Then the appearance of the coating was evaluation. Table 5 shows the results.

TABLE 5

|  | Comparative icing | Erythritol (*1) | Anhydrous glucose (*2) |
| --- | --- | --- | --- |
| Sugar | 82 | 74 | 74 |
| Syrup | 7.5 | — | — |
| Fat BST (*3) | — | 25 | 25 |
| Emulsifier ER-290 (*3) | — | 0.5 | 0.5 |
| Extremely hardened rapeseed oil (*3) | — | 0.5 | 0.5 |
| Water | 10.5 | — | — |
| Viscosity (P) (70° C.) | 200< | 65 | 67 |
| Appearance | B | A | A |

Note
(*1): Grain size distribution:
63–53 μm 56.8 (%)
53–45 μm 31.8 (%)
45–32 μm 9.5 (%)
32–22 μm 1.9 (%)
(*2): Particles less than 63 μm, containing 50% by weight or more of those having a size of from 32 μm to 63 μm were used.
(*3): The same as those used in Example 4 (refer to Table 4).

As Table 5 shows, the invention products were less hygroscopic and had lower viscosities, than the comparative one, and thus could be easily handled.

When the icing of the present invention is applied onto the surface of baked products and then packaged in sacks, it neither undergoes dissolution nor becomes tacky. Thus the coated products show an excellent appearance and good handling characteristics.

While the invention has been described in detail and with reference to specific examples thereof, it will be apparent to one skilled in the art that various changes and modifications can be made therein without departing from the spirit and scope thereof.

What is claimed is:

1. A non-hygroscopic icing composition comprising sugar, fat and an emulsifier as the main components, wherein 80% by weight or more of said sugar is particles passing through a 63 μm mesh size sieve and 50% by weight or more of said sugar is particles having a size of from 45 μm to 63 μm and the sugar content in the icing is 50% by weight or more.

2. An icing composition as in claim 1, wherein 90% by weight or more of said sugar is particles passing through a 63 μm size sieve.

3. An icing composition as in claim 1, wherein said emulsifier is selected from a lipophilic sucrose fatty acid ester and a lipophilic polyglycerol fatty acid ester.

4. An icing composition as in claim 3, wherein said emulsifier is a sucrose fatty acid ester comprising at least one of a saturated fatty acid having 16 to 24 carbon atoms as constituting fatty acid and an unsaturated fatty acid having 16 to 24 carbon atoms as constituting fatty acid, which has an average degree of substitution of 4 to 7.

5. An icing composition as in claim 3, wherein said emulsifier is a polyglycerol fatty acid ester comprising at least one of a saturated fatty acid having 12 to 24 carbon atoms as constituting fatty acid and an unsaturated fatty acid having 12 to 24 carbon atoms as constituting fatty acid, which has a degree of condensation of glycerol of 4 to 10 and an average degree of esterification of 50 to 90%.

6. An icing composition as in claim 1, wherein said sugar in the icing is at least one kind selected from the group consisting of sucrose, erythritol and glucose.

7. An icing composition as in claim 1, wherein the weight ratio of the sugar to the fat contained in the icing ranges from 60:40 to 80:20.

8. An icing composition as in claim 1, wherein the content of the emulsifier in the icing is from 0.1 to 3% by weight.

9. An icing composition as in claim 1, wherein the moisture content in the icing is 1% by weight or less.

* * * * *